United States Patent
Kohlenberg et al.

(10) Patent No.: US 10,152,336 B2
(45) Date of Patent: Dec. 11, 2018

(54) TECHNOLOGIES FOR MANAGING SENSOR CONFLICTS

(71) Applicant: Intel Corporation, Santa Clara, CA (US)

(72) Inventors: Tobias M. Kohlenberg, Portland, OR (US); Brian D. Johnson, Portland, OR (US); John C. Weast, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 156 days.

(21) Appl. No.: 14/757,833

(22) Filed: Dec. 26, 2015

(65) Prior Publication Data

US 2017/0185428 A1 Jun. 29, 2017

(51) Int. Cl.
| | |
|---|---|
| *G06F 9/445* | (2018.01) |
| *G06F 11/30* | (2006.01) |
| *G06F 11/34* | (2006.01) |
| *G06F 11/07* | (2006.01) |
| *G06F 9/4401* | (2018.01) |

(52) U.S. Cl.
CPC ...... *G06F 9/44505* (2013.01); *G06F 11/0709* (2013.01); *G06F 11/0751* (2013.01); *G06F 11/0772* (2013.01); *G06F 11/3024* (2013.01); *G06F 11/3409* (2013.01); *G06F 9/4411* (2013.01); *G06F 11/0739* (2013.01)

(58) Field of Classification Search
CPC .......................... G06F 9/44505; G06F 11/3409
See application file for complete search history.

(56) References Cited

U.S. PATENT DOCUMENTS

| | | | |
|---|---|---|---|
| 2003/0216876 A1* | 11/2003 | Premerlani | G06F 1/12 702/58 |
| 2005/0001472 A1* | 1/2005 | Bale | B60G 17/0195 303/20 |
| 2005/0222895 A1 | 10/2005 | Jakobson et al. | |
| 2009/0138097 A1* | 5/2009 | Rinaldi | H04L 41/00 700/17 |
| 2010/0302028 A1 | 12/2010 | Desai et al. | |

(Continued)

FOREIGN PATENT DOCUMENTS

KR 10-0844015 7/2008

OTHER PUBLICATIONS

International search report for PCT application No. PCT/US/2016/063610, dated Feb. 27, 2017 (9 pages).

(Continued)

*Primary Examiner* — Phil Nguyen
(74) *Attorney, Agent, or Firm* — Barnes & Thornburg LLP

(57) ABSTRACT

Technologies for managing sensor conflicts in a compute system include determining an implication of stimuli sensed by two or more sensors of the compute system and determining whether a conflict exists between the determined implications. If a conflict does exist, an amount of discomfort is applied to the compute device. For example, a performance characteristic of the compute device may be adversely impacted based on the determined conflict. In some embodiments, the level of applied discomfort is based on a magnitude, importance, and/or duration of the implication conflict.

22 Claims, 3 Drawing Sheets

(56) References Cited

U.S. PATENT DOCUMENTS

| | | | | |
|---|---|---|---|---|
| 2011/0289133 | A1* | 11/2011 | Shikano | H04L 67/12 709/202 |
| 2012/0005149 | A1* | 1/2012 | Chen | G06N 5/04 706/52 |
| 2014/0101088 | A1 | 4/2014 | Hall et al. | |
| 2015/0071090 | A1* | 3/2015 | Mohammed | H04M 1/72569 370/252 |
| 2015/0083044 | A1 | 3/2015 | Nielsen et al. | |
| 2015/0175178 | A1* | 6/2015 | Ignatius | B61L 15/0063 246/120 |
| 2016/0167653 | A1* | 6/2016 | Malone | B60W 10/18 701/23 |
| 2016/0258772 | A1* | 9/2016 | Chang | G01S 5/0263 |
| 2017/0057528 | A1* | 3/2017 | Green | B61L 25/025 |

OTHER PUBLICATIONS

Written opinion for PCT application No. PCT/US/2016/063610, dated Feb. 27, 2017 (7 pages).

* cited by examiner

TECHNOLOGIES FOR MANAGING SENSOR CONFLICTS

BACKGROUND

Sensors and sensing circuits are incorporated in an ever-growing number of electronic devices and computing systems. For example, in Internet of Things (IoT) applications, computing systems with hundreds or thousands of sensors are possible. With such a large number of sensors, managing conflicts in generated sensor data can be complex and process intensive. In many typical systems, the sensor data is fully interpreted to understand the meaning of the sensor data prior to any identification of conflicts in the sensor data, which can create delays in resolving the conflicts and wasted computational resources. For example, a compute system may fully interpret sensor data produced by an accelerometer to determine a speed of the compute system and compare the determined speed to a threshold speed prior to detecting a possible conflict with visual sensor data produced by a camera indicating a much slow speed of movement. In such a scenario, the accelerometer sensor data is fully interpreted prior to identifying the possible conflict with the visual sensor data, even though the accelerometer sensor data may be erroneous.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
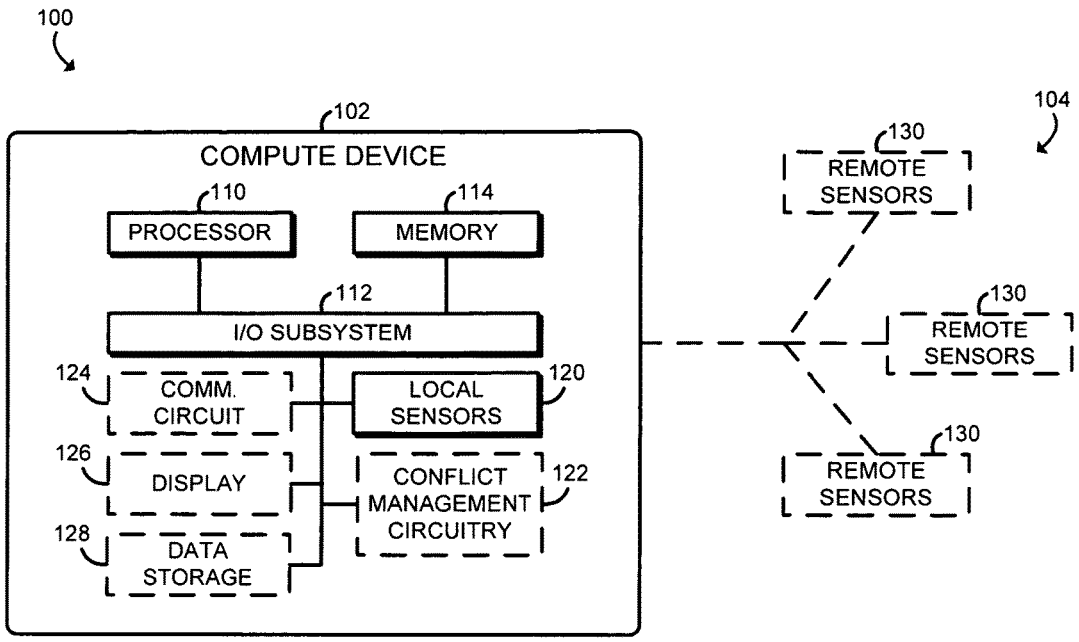
FIG. 1 is a simplified block diagram of at least one embodiment of a system for managing sensor conflicts.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute system 100 for managing sensor conflicts includes a compute device 102 and, in some embodiments, a distributed sensor array 104. In use, as discussed in more detail below, the compute device 102 is configured to monitor sensor data produced by local sensors 120 of the compute device 102 and/or remote sensors 130 of the distributed sensor array 104 and determine whether any conflicts exists between the various sensor data. In typical fashion, the sensors 120, 130 are configured to produce sensor data in response to a detected stimulus (e.g., motion, temperatures, light, pressure, electrical connectivity, etc.). To detect a conflict between the produced sensor data, the compute device 102 is configured to determine an implication of the stimulus sensed by each sensor 120, 130 based on the sensor data produced by the corresponding sensor 120, 130. As discussed in more detail below, the determined implications are embodied as high-level or restricted meanings of the sensor data, which are determined by the compute device 102 without intensive data analysis. For example, in an embodiment in which a sensor 120, 130 is embodied as an accelerometer, the compute device 102 may be configured to determine the implication that "the compute device 102 is moving," rather than a more specific meaning of the sensor data, such as the specific speed of the compute device 102 and whether the specific speed has achieved a required speed threshold for activation of a related function. In this way, the compute device 102 may more quickly identify conflicts between sensor data.

In the illustrative embodiment, the compute device 102 is configured to determine a conflict between sensor data produced by two or more sensor 120, 130 by comparing the related implications based on a corresponding correlation rule. The correlation rule defines an expected relationship between the determined implications. For example, if the compute device 102 determines an implication that "the compute device 102 is moving" based on sensor data from a motion sensor 120, 130, the correlation rule may dictate that sensor data from a camera sensor 120, 130 should prompt a similar implication (e.g., based on objects moving in the captured images).

If the compute device 102 determines that the two or more implications are in conflict or otherwise do not satisfy a related correlation rule, an amount of discomfort is applied to the compute device 102. For example, in the illustrative embodiment, a performance characteristic of the compute device 102 is adversely impacted based on the determined conflict. Any type of performance characteristic may be impacted such as the processing speed of the compute device 102, the data throughput of the compute device 102, the responsiveness of the compute device 102, the percentage of idle time of the compute device 102, and/or other performance characteristics of the compute device 102. The compute device 102 (e.g., a component thereof) may perform one or more actions to impact the performance characteristic including, but not limited to, generating alerts to a processor of the compute device 102, slowing a process executed by the compute device 102, deprioritizing a process executed by the compute device 102, increasing an amount of data supplied to a processor of the compute device 102, adjusting a priority associated with the sensor data, and/or other actions that adversely impact a performance characteristic of the compute device 102.

In the illustrative embodiment, the amount of discomfort applied to the compute device 102 (i.e., the severity of the adverse impact to performance characteristic) is dependent on the determined conflict. For example, the amount of applied discomfort may be proportional to a magnitude or level of importance of the determined conflict. Additionally, if the conflict is not resolved by the compute device 102, the amount of applied discomfort to the compute device 102 may increase over time. In this way, the compute device 102 is configured to apply "discomfort" to itself in response to a determined sensor data conflict much in the same way as the human body experiences discomfort from sensory conflict of two or more of the six senses (e.g., nausea caused when sensory data from a person's ear and sensory data from a person's eyes are in conflict due to an internal ear infection or the like).

The compute device 102 may be embodied as any type of compute device configured to utilize multiple sensors during operation and perform the functions described herein. For example, the compute device 102 may be embodied as or otherwise include, without limitation, a computer, a server, a server system, an analysis compute device, a networking device, a multiprocessor system, a processor-based system, a consumer electronic device, a smartphone, a tablet computer, a notebook computer, a laptop computer, a desktop computer, a wearable computer, a smart accessory such as a smart watch or smart glasses, a messaging device, and/or any other computing device capable of utilizing various sensors. As shown in FIG. 1, the illustrative compute device 102 includes a processor 110, an I/O subsystem 112, a memory 114, and local sensors 120. Of course, the compute device 102 may include other or additional components, such as those commonly found in a computer device (e.g., various input/output devices), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. The processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the compute device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the compute device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processors 110, the memory 114, and other components of the compute device 102, on a single integrated circuit chip.

The local sensors 120 may be embodied as, or otherwise include, any type of sensor, sensing circuit, or sensor device capable of measuring or otherwise capturing data indicative of sensed stimuli. For example, the sensors 120 may include, but are not limited to, environmental sensors such as temperature or barometric pressure sensors, motion sensors such as accelerometers, biometric sensors such as heart rate sensors or galvanic skin response sensors, authentication sensors such as fingerprint scanner sensors, artificial sense sensors such as cameras or microphones, measurement sensors such as pressure or light sensors, and/or any other type of sensor capable of producing sensor data indicative of a sensed stimulus. Illustratively, the local sensors 120 are incorporated in the compute device 102. For example, in embodiments in which the components of the compute device 102 form a system-on-a-chip (SoC), the local sensors 120 may be included on the same die with the other components.

In some embodiments, the compute device 102 may include dedicated conflict management circuitry 122. The conflict management circuitry 122 may be embodied as a co-processor or other dedicated circuit(s) and/or device(s) configured to determine implications of stimuli sensed by the sensors 120, 130, determine conflicts between the determined implications, and apply discomfort to the compute device 102 (e.g., to other components of the compute device 102). By off-loading the sensor data conflict management to the conflict management circuitry 122, the speed at which sensor data conflicts are recognized and resolved may be increased by reducing the workload on the processor 110.

In some embodiments, the compute device 102 may also include data storage 124, a communication circuit 126, and/or a display 127. The data storage device 124 may be embodied as any type of device or devices configured for short-term or long-term storage of data such as, for example, memory devices and circuits, memory cards, hard disk drives, solid-state drives, or other data storage devices. The communication circuitry 126 may be embodied as any communication circuit, device, or collection thereof, capable of enabling communications between the compute device 102 and other devices. To do so, the communication circuitry 126 may be configured to use any one or more communication technology (e.g., wired or wireless communications) and associated protocols (e.g., Ethernet, Bluetooth®, Wi-Fi®, WiMAX, etc.) to effect such communication. The display 127 may be embodied as any type of display capable of displaying digital information such as a liquid crystal display (LCD), a light emitting diode (LED), a plasma display, a cathode ray tube (CRT), or other type of display device. Of course, the compute device 102 may include additional or other peripheral devices in some embodiments. Such peripheral devices may be embodied as, or otherwise include, any type of additional input/output devices, interface device, and/or other components and/or devices commonly found in a compute system including, but not limited to, graphics circuitry, keyboard, mouse, speaker system, network interface, and/or other input/output devices, interface devices, and/or peripheral devices.

As discussed above, the distributed sensor array 104 includes one or more remote sensors 130 communicatively coupled to the compute device 102, but remote therefrom. The remote sensors 130 may be similar to the local sensors 120 and be embodied as, or otherwise include, any type of any type of sensor, sensing circuit, or sensor device capable of measuring or otherwise capturing data indicative of sensed stimulus, such as those sensors discussed above in regard to the local sensors 120.

Figure 2:
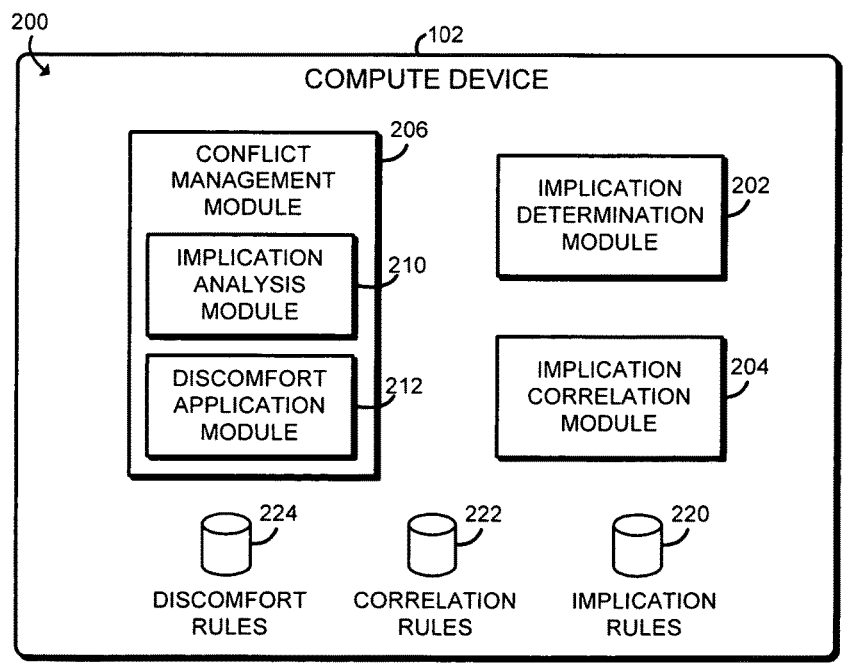
FIG. 2 is a simplified block diagram of at least one embodiment of an environment that may be established by a compute device of the system of FIG. 1.

Referring now to FIG. 2, in an illustrative embodiment, the compute device 102 establishes an environment 200 during operation. The illustrative environment 200 includes an implication determination module 202, an implication correlation module 204, and a conflict management module 206. The various modules of the environment 200 may be embodied as hardware, firmware, software, virtualized hardware, emulated architecture, or a combination thereof. As such, in some embodiments, one or more of the modules of the environment 200 may be embodied as circuitry or collection of electrical devices (e.g., a determination circuit 202, an implication correlation circuit 204, a conflict management circuit 206, etc.). It should be appreciated that, in such embodiments, one or more of the determination circuit 202, the implication correlation circuit 204, and the conflict management circuit 206 may form a portion of one or more of the processor 110, the I/O subsystem 112, and/or other components of the compute device 102. Additionally, in some embodiments, one or more of the illustrative modules may form a portion of another module and/or one or more of the illustrative modules may be independent of one another. During use, the various modules of the environment 200 may generate and/or utilize various data including, but not limited to, implication rules 220, correlation rules 222, and discomfort rules 224 as discussed below.

The implication determination module 202 is configured to monitor the sensor data produced by the sensors 120, 130 in response to sensed stimuli and determine or generate an implication of each sensed stimulus based on the associated sensor data. The determined implications may be embodied as any type of implication or description of the stimulus represented by the sensor data (e.g., "the compute device 102 is moving," "there is noise present in the environment of the compute device 102," "the local environment is dark," "the compute device 102 is above sea level," "an entity is approaching the compute device 102," etc.). That is, each implication describes the stimulus represented by the sensor data in a general or high-level. To determine or generate the implications, the implication determination module 202 may observe sensor data for a period of time (e.g., during a training period) and determine associated implications using a machine or deep learning algorithm. Of course, the machine or deep learning algorithm may require an initial set of determined implications, which may be provided to the compute device 102 via the user or manufacturer of the compute device 102. Additionally, in some embodiments, some or all of the implications may be hard-coded into the compute device 102. The determined or provided implications are stored as implication rules 220, which are usable by the compute device 102 to subsequently determine implications based on observed sensor data.

The implication correlation module 204 is configured to monitor the implications generated by the implication determination module 202 and determine or generate correlation rules 222 based on the observed implications. As discussed above, each correlation rule 222 defines an expected relationship between two or more implications. The expected relationship can be simple or complex and may rely on any two or more implications. To generate the correlation rules 222, the implication correlation module 204 may utilize any suitable methodology or algorithm including, for example, a machine or deep learning algorithm. As such, in some embodiments, the implication correlation module 204 may monitor the implications determined by the implication determination module 202 during a training period (e.g., during an initialization phase of the system 100). Of course, as discussed below, the implication correlation module 204 may also determined implications during normal operation of the system 100 and update the correlation rules 222 over time based on observed correlations. Additionally, in some embodiments, one or more of the correlation rules 222 may be "hard-coded" or otherwise supplied by an operator or manufacturer of the system 100, rather than inferred or determined by the implication correlation module 204 based on the implications identified by the implication determination module 202. Alternatively, an correlation determining model may be provided to the machine or deep learning algorithm, which updates the model over time based on observed behavior (e.g., observed implications) to generate an updated model, which is used again to generate yet another updated model, and so forth.

The conflict management module 206 is configured to monitor sensor data produced by the sensors 120, 130 during operation of the system 100 and determine implications of stimuli sensed by the sensors 120, 130 based on the implication rules 220. Additionally, the conflict management module 206 is configured to detect any conflicts between two or more implications and apply discomfort to the compute device 102 in response to detecting one or more conflicts. As discussed above, the conflict management module 206 may be embodied as firmware, software, hardware, and/or a combination thereof. For example, in some embodiments, the conflict management module 206 may be embodied as, or otherwise established by, the conflict management circuitry 122. In other embodiments, the conflict management module 206 may be embodied as a privileged or prioritized software/firmware function.

The conflict management module 206 illustratively includes an implication analysis module 210 and a discomfort application module 212. The implication analysis module 210 is configured to analyze the sensor data produced by the sensors 120, 130 and determine implications of stimuli represented by such sensor data. To do so, the implication analysis module 210 may compare the sensor data to the implication rules 220 to determine the implication. In other embodiments, the implication analysis modules 210 may determine an implication based on sensor data at runtime, without relying on the pre-defined implication rules 220 (e.g., using the methodology employed by the implication determination module 202).

The implication analysis module 210 is also configured to compare two or more determined implications to determine whether any conflict exists between the implications. To do so, the implication analysis module 210 may compare the implications using the correlation rules 222. As discussed above, the correlation rules define expected relationships between various implications. As such, if the implication analysis module 210 determines that the two or more implications do not exhibit the expected relationship defined by an associated correlation rule 222, the implication analysis module 210 may determine that a conflict between the implications is present. It should be appreciated that because the implications are embodied as high-level meanings and/or general representations of the stimulus sensed by the sensors 120, 130, the implication analysis module 210 is able to identify conflicts in a relatively quick and efficient manner.

The discomfort application module 212 is configured to apply an amount of discomfort to the compute device 102 (e.g., to components of the compute device 102 such as the processor 110) in response to any conflict detected by the implication analysis modules 210. To do so, as discussed above, the discomfort application module 212 is configured to adversely impact a performance characteristic of the compute device 102. Again, the discomfort application module 212 may adversely impact any type of performance characteristic including, but not limited to, a clock speed of the compute device 102, a processing speed of the processor 110, responsiveness of various components of the compute device 102, and/or other performance characteristic of the compute device 102. To impact the performance characteristic, the discomfort application module 212 may perform any suitable method or action. For example, the discomfort application module 212 may adversely impact the performance characteristic(s) of the compute device 102 by generating alerts to the processor 110, slowing a process executed by a component of the compute device 102, deprioritizing a process executed by a component of the compute device 102, increasing an amount of data supplied to the processor 110, adjusting a priority associated with the corresponding sensor data, and/or other actions that adversely impact a performance characteristic of the compute device 102. Additionally, as discussed above, the discomfort application module 212 may apply the discomfort to the compute device 102 in accordance with a determined magnitude or strength of the conflict, a determined level of importance of the conflict, and/or a duration of the conflict. For example, the discomfort application module 212 may increase the severity of the adverse impact on the performance characteristic(s) of the compute device 102 over time if the identified conflict is not resolved.

Figure 3:
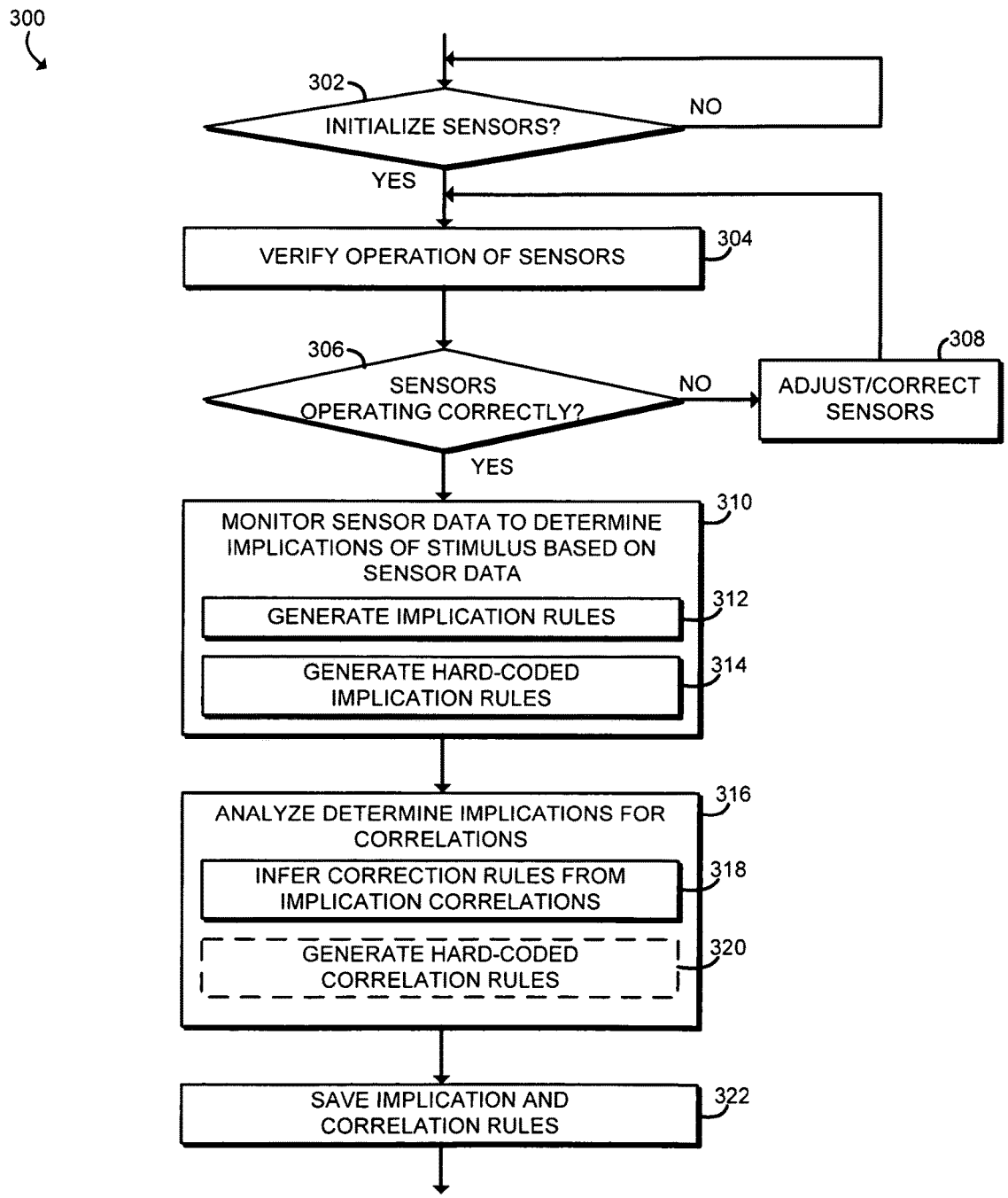
FIG. 3 is a simplified flow diagram of at least one embodiment of a method for initializing sensors that may be executed by the compute device of the system of FIGS. 1 and 2.

Referring now to FIG. 3, in use, the compute device 102 may execute a method 300 for initializing the sensors 120, 130 of the system 100. The method 300 begins with block 302 in which the compute device 102 determines whether to initialize the sensors 120, 130. For example, the sensors 120, 130 may be initialized upon every power up of the compute device 102 or initialized only during a training period as discussed below. If the sensors 120, 130 are to be initialized, the method 300 advances to block 304 in which the compute device 102 verifies the operation of each sensor 120, 130 of the system 100. In block 306, the compute device 102 determines whether each sensor 120, 130 of the system 100 was successfully verified. If not, the method 300 advances to block 308 in which the unverified or otherwise inoperable sensor(s) 120, 130 are adjusted or corrected. For example, any malfunctioning sensors 120, 130 may be recalibrated or otherwise replaced with properly functioning sensors 120, 130 in block 308. The method 300 subsequently loops back to block 304 in which the compute device 102 continues to verify the proper operation of all sensors 120, 130 of the system 100.

Referring back to block 306, if the compute device 102 determines that each sensor 120, 130 of the system 100 is operating correctly (i.e., the compute device 102 has successfully verified each sensor 120, 130), the method 300 advances to block 310. In block 310, the compute device 102 monitors the sensor data produced by the verified sensors 120, 130 during operation to determine implications of the stimuli sensed by each sensor 120, 130. To do so, the implication determination module 202 may observe sensor data produced by the sensors 120, 130 for a period of time and determine associated implications using a machine learning algorithm or other artificial intelligence technique. In block 312, the compute device 102 generates or determines the implication rules 220 based on the sensor data and associated determined implications. For example, the compute device 102 may define an implication for a particular type of sensor data (e.g., an implication of "the compute device 102 is moving" for sensor data indicative of any type of motion). Additionally or alternatively, in some embodiments in block 324, the compute device 102 may receive hard-coded implication rules 220 from a user or manufacturer of the compute device 102.

Subsequently in block 316, the compute device 102 analyzes the implications determined in block 310 to identify correlations between two or more implications. The compute device 102 may utilize any suitable methodology to determine correlations between the implications. For example, in the illustrative embodiment, the compute device 102 is configured to determine that a correlation exists between two or more determined implications if the compute device 102 is able to identify some type of relationship between the determined implications. The identified relationship may be loose or strict in nature. Based on the analysis of the implications, the compute device 102 infers a correlation rule 222 for the correlated implications in block 318. As discussed above, each correlation rule 222 defines an expected relationship between two or more implications. Additionally or alternatively, in some embodiments, the compute device 102 may receive hard-coded correlation rules 222 from a user or manufacturer of the compute device 102.

After the compute device 102 determines the implication rules 220 in block 310 and the correlation rule 222 in block 316, the compute device 102 may store the implication rules 220 and the correlation rule 222 in block 322. For example, the compute device 102 may store the implication rules 220 and the correlation rule 222 in the data storage 128.

Figure 4:
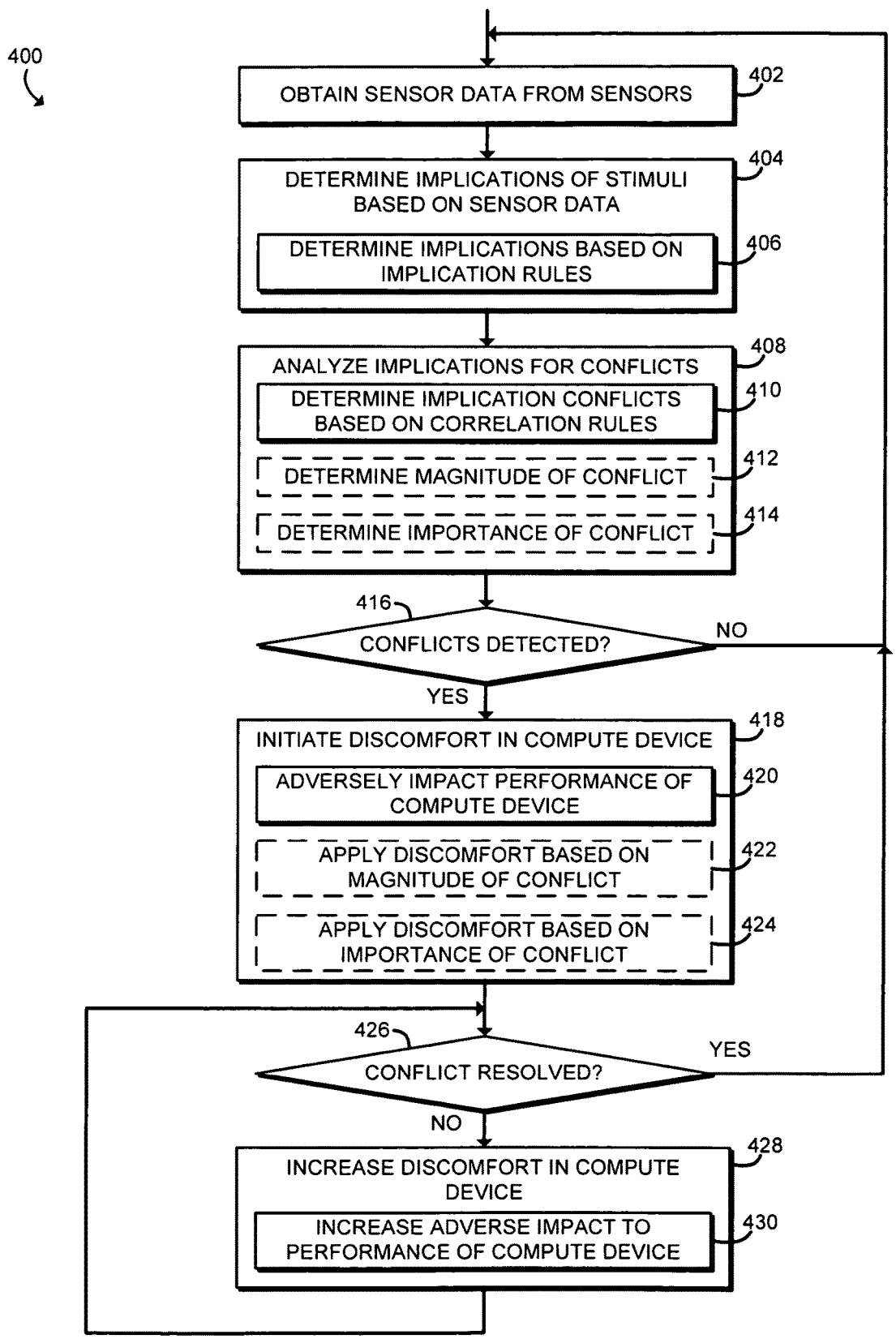
FIG. 4 is a simplified flow diagram of at least one embodiment of a method for managing sensor conflicts that may be executed of the compute device of the system of FIGS. 1 and 2.

Referring now to FIG. 4, in use, the compute device 102 may execute a method 400 for managing sensor conflicts. The method 400 begins with block 402 in which the compute device 102 obtains sensor data from the sensors 120, 130. For example, the compute device 102 may continually or periodically receive sensor data from the sensors 120, 130 and/or poll the sensors 120, 130 to obtain the sensor data. Regardless, in block 404, the compute device 102 determines an implication of the stimuli sensed by each sensor 120, 130 based on the sensor data produced by that corresponding sensor 120, 130. To do so, as discussed above, the compute device 102 may compare the produced sensor data to the implication rules 220 in block 406 to identify a corresponding implication. As discussed above, each implication may be embodied as a high-level or general description of the stimulus represented by the sensor data produced by the corresponding sensor 120, 130. For example, the implications may describe various characteristics of the compute device 102 and/or an environment of the compute device 102.

After the compute device 102 has determined the various implications based on the produced sensor data in block 404, the method 400 advances to block 408. In block 408, the compute device 102 analyzes the determined implications for conflicts. For example, the compute device 102 may compare the various implications to determine whether any two or more implications define conflicting descriptions or characteristics of the of the compute device 102 and/or an environment of the compute device 102. To do so, the compute device 102 may compare the various determine implications with each other using the correlation rules 222 in block 410. As discussed above, the correlation rules 222 define expected relationships between implications. As such, the compute device 102 may identify conflicts between two or more implications by determining whether the two or more implications exhibit the expected relationship defined by an associated correlation rule 222.

In some embodiments, in block 412, the compute device 102 may also determine a magnitude or strength of any identified conflict. The magnitude of a conflict may define the severity at which the two or more implications conflict. For example, two implications that describe directly opposing descriptions of a stimulus (e.g., one implication is "the compute device 102 is moving," while another implication is "the compute device 102 is stationary") may be determined to have a high magnitude of conflict. Alternatively, two implications that simply do provide different levels of detail (e.g., one implication is "the compute device 102 is moving," while another implication is "the compute device 102 is moving northwardly") may be determined to have a low magnitude of conflict. Further, two implications that generally agree but provide conflicting details (e.g., one implication is "the compute device 102 is moving northwardly," while another implication is "the compute device 102 is moving easterly") may be determined to have a medium magnitude of conflict. The compute device 102 may utilize any suitable methodology to determine the magnitude of any identified conflict (e.g., by comparing each conflict to predefine magnitude rules).

Additionally or alternatively, in some embodiments in block 414, the compute device 102 may determine a level of importance of any identified conflict. The level of importance of a conflict may define the severity of the conflict. For example, conflicts that affect the safety of the user of the compute device 102 may be determined to have a high level of importance. Additionally, conflicts that affect the accuracy of computations of the compute device 102 may be determined to have a high level of importance in some applications. Conversely, conflicts that have little to no impact on the functionality of the compute device 102 may be determined to have a low level of importance. The compute device 102 may utilize any suitable method to determine the magnitude of any identified conflict. The compute device 102 may utilize any suitable methodology to determine the level of importance of any identified conflict (e.g., by comparing each conflict to predefine importance rules).

In block 416, the compute device 102 determines whether any conflicts between the determined implications have been detected. If not, the method 400 loops back to block 402 in which the compute device 102 continues to obtain sensor data from the sensors 120, 130. If, however, the compute device 102 detects a conflict between two or more implications, the method 400 advances to block 418. In block 418, the compute device 102 (e.g., the conflict management circuitry 122) initiates discomfort in itself based on the identified conflict(s). To do so, one or more performance characteristics of the compute device 102 are adversely impacted in block 420. The compute device 102 (or components thereof) may perform any action that has an adverse impact on one or more performance characteristics of the compute device 102. For example, the compute device 102 may generate alerts to the processor 110, slow a process executed by a component of the compute device 102, deprioritize a process executed by a component of the compute device 102, increase an amount of data supplied to the processor 110, adjust a priority associated with the corresponding sensor data, and/or perform other actions that adversely impact a performance characteristic of the compute device 102. The particular performance characteristic of the compute device 102 impacted in block 420 may be embodied as any type of characteristic or quality related to any aspect of the performance of the compute device such as a clock speed of the compute device 102, a processing speed of the processor 110, responsiveness of various components of the compute device 102, and/or other performance characteristic of the compute device 102.

In some embodiments, in block 422, the compute device 102 may apply the discomfort based on the magnitude or strength of the identified conflict(s) as determined in block 412. For example, the severity of the adverse impact applied in block 420 may be a function of the determined magnitude. Similarly, in block 424, the compute device 102 may apply the discomfort based on the level of importance the identified conflict(s) as determined in block 414. For example, the severity of the adverse impact applied in block 420 may be a function of the determined level of importance of the identified conflict(s).

After the compute device 102 applies the discomfort based on the identified conflicts in block 418, the method 400 advances to block 426 in which the compute device 102 determines whether the conflict has been resolved. If so, the method 400 loops back to block 402 in which the compute device 102 continues to obtain sensor data from the sensors 120, 130. If, however, the conflict has not been resolved, the method 400 advances to block 428 in which the discomfort applied to the compute device 102 is increased. For example, the severity of the adverse impact to the performance characteristic(s) of the compute device 102 may be increased in block 430. The method 400 subsequently loops back to block 426 in which the compute device 102 determines whether the conflict(s) has been resolved. In this way, the amount of discomfort applied to the compute device 102 is increased as the duration of the conflict increases.

It should be appreciated that in the illustrative embodiment, the method 400 may be executed by the conflict management circuitry 122 and/or as a privileged or prioritized software/firmware routine. In such embodiments, the adverse impact on the performance characteristics to the compute device 102 may be applied to other components of the compute device 102 such as the processor 110, the memory 114, and/or the I/O subsystem 112. Additionally, similar to human discomfort caused by conflicting sensory information, the discomfort applied to the compute device 102 may initiate at a low severity but increase over time until the compute device 102 must attend to the conflict to operate effectively.

EXAMPLES

Illustrative examples of the technologies disclosed herein are provided below. An embodiment of the technologies may include any one or more, and any combination of, the examples described below.

Example 1 includes a compute system for managing sensor conflicts of the compute system. The compute system includes a first sensor to produce first sensor data in response to a first stimulus; a second sensor to produce second sensor data in response to a second stimulus; and a conflict management module to (i) determine a first implication of the first stimulus based on the first sensor data, (ii) determine a second implication of the second stimulus based on the second sensor data, (iii) determine a conflict between the first implication and the second implication, and (iv) apply discomfort to the compute device in response to the determined conflict between the first implication and the second implication, wherein to apply discomfort to the compute device comprises to adversely impact a performance characteristic of the compute device based on the determined conflict.

Example 2 includes the subject matter of Example 1, and further comprising a data storage to store a set of implication rules that correlate predefined implications and types of sensor data, and wherein to determine the first implication and the second implication comprises to determine the first implication and the second implication based on the set of implication rules.

Example 3 includes the subject matter of Examples 1 or 2, and wherein to determine the first implication of the first stimulus based on the first sensor data comprises to determine a first characteristic of the compute device based on the first sensor data, and to determine the second implication of the second stimulus based on the second sensor data comprises to determine a second characteristic of the compute device based on the second sensor data.

Example 4 includes the subject matter of any of Examples 1-3, and wherein to determine the first implication of the first stimulus based on the first sensor data comprises to determine a first characteristic of an environment of the compute device based on the first sensor data, and to determine the second implication of the second stimulus based on the second sensor data comprises to determine a second characteristic of an environment of the compute device based on the second sensor data.

Example 5 includes the subject matter of any of Examples 1-4, and further comprising a data storage to store a set of correlation rules that define an expected relationship between the first implication and the second implication, and wherein to determine the conflict between the first implication and the second implication comprises to determine the conflict between the first implication and the second implication based on the set of correlation rules.

Example 6 includes the subject matter of any of Examples 1-5, and wherein to determine the conflict between the first implication and the second implication comprises to determine a magnitude of the conflict between the first implication and the second implication.

Example 7 includes the subject matter of any of Examples 1-6, and wherein to apply discomfort to the compute device comprises to apply discomfort to the compute device based on the magnitude of the conflict between the first implication and the second implication.

Example 8 includes the subject matter of any of Examples 1-7, and wherein to apply discomfort to the compute device comprises to adversely impact the performance characteristic of the compute device as a function of the magnitude of the conflict between the first implication and the second implication.

Example 9 includes the subject matter of any of Examples 1-8, and wherein to determine the conflict between the first implication and the second implication comprises to determine a level of importance of the conflict between the first implication and the second implication.

Example 10 includes the subject matter of any of Examples 1-9, and wherein to apply discomfort to the compute device comprises to apply discomfort to the compute device based on the level of importance of the conflict between the first implication and the second implication.

Example 11 includes the subject matter of any of Examples 1-10, and wherein to apply discomfort to the compute device comprises to adversely impact the performance characteristic of the compute device as a function of the level of importance of the conflict between the first implication and the second implication.

Example 12 includes the subject matter of any of Examples 1-11, and wherein the conflict management module is further to determine whether the determined conflict has been resolved; and increase the discomfort to the compute device in response to a determination that the conflict has not been resolved.

Example 13 includes the subject matter of any of Examples 1-12, and wherein to increase the discomfort to the compute device comprises to increase the adverse impact on the performance of the compute device in response to a determination that the conflict has not be resolved.

Example 14 includes the subject matter of any of Examples 1-13, and wherein to determine whether the determined conflict has been resolved comprises to periodically determine whether the conflict has been resolved.

Example 15 includes the subject matter of any of Examples 1-14, and wherein to adversely impact the performance characteristic of the compute device comprises to generate alerts to a processor of the compute device.

Example 16 includes the subject matter of any of Examples 1-15, and wherein to adversely impact the performance characteristic of the compute device comprises to slow a process executed by the compute device.

Example 17 includes the subject matter of any of Examples 1-16, and wherein to adversely impact the performance characteristic of the compute device comprises to deprioritize a process executed by the compute device.

Example 18 includes the subject matter of any of Examples 1-17, and wherein to adversely impact the performance characteristic of the compute device comprises to increase an amount of data supplied to a processor of the compute device.

Example 19 includes the subject matter of any of Examples 1-18, and wherein to adversely impact the performance characteristic of the compute device comprises to adjust a priority associated with the first sensor data or second sensor data.

Example 20 includes a method for managing sensor conflicts in a compute system. The method includes obtaining, by a compute device of the compute system, sensor data from a plurality of sensors of the compute system, wherein the sensor data is produced by the plurality of sensors in response to a corresponding stimulus sensed by each sensor; determining, by the compute device, an implication of the stimulus sensed by each sensor; determining, by the compute device, a conflict between two or more implications of the stimuli, and applying, by the compute device, discomfort to the compute device in response to the determined conflict between the two or more implications of stimuli exist, wherein applying discomfort comprises adversely impacting a performance characteristic of the compute device based on the determined conflict.

Example 21 includes the subject matter of Example 20, and wherein determining the implication of the stimulus sensed by each sensor comprises determining the implication for the stimulus sensed by each sensor based on a set of implication rules that correlate predefined implications and types of sensor data.

Example 22 includes the subject matter of Example 20 or 21, and wherein determining the implication of the stimulus sensed by each sensor comprises determining a characteristic of the compute device based on the sensor data.

Example 23 includes the subject matter of any of Examples 20-22, and wherein determining the implication of the stimulus sensed by each sensor comprises determining a characteristic of an environment of the compute device based on the sensor data.

Example 24 includes the subject matter of any of Examples 20-23, and wherein determining a conflict between two or more implications of the stimuli comprises determining a conflict between two or more implications of the stimuli based on a set of correlation rules, wherein each correlation rule defines an expected relationship between the two or more implications of the stimuli.

Example 25 includes the subject matter of any of Examples 20-24, and wherein determining the conflict between the two or more implications of stimuli comprises determining a magnitude of the conflict between the two or more implications of stimuli.

Example 26 includes the subject matter of any of Examples 20-25, and wherein applying discomfort to the compute device comprises applying discomfort to the compute device based on the magnitude of the conflict between the two or more implications of stimuli.

Example 27 includes the subject matter of any of Examples 20-26, and wherein applying discomfort to the compute device comprises adversely impacting the performance characteristic of the compute device as a function of the magnitude of the conflict between the two or more implications of stimuli.

Example 28 includes the subject matter of any of Examples 20-27, and wherein determining the conflict between the two or more implications of stimuli comprises determining a level of importance of the conflict between the two or more implications of stimuli.

Example 29 includes the subject matter of any of Examples 20-28, and wherein applying discomfort to the compute device comprises applying discomfort to the compute device based on the level of importance of the conflict between the two or more implications of stimuli.

Example 30 includes the subject matter of any of Examples 20-29, and wherein applying discomfort to the compute device comprises adversely impacting the performance characteristic of the compute device as a function of the level of importance of the conflict between the two or more implications of stimuli.

Example 31 includes the subject matter of any of Examples 20-30, and further comprising determining, by the compute device, whether the determined conflict has been resolved; and increasing the discomfort to the compute device in response to a determination that the conflict has not been resolved.

Example 32 includes the subject matter of any of Examples 20-31, and wherein increasing the discomfort to the compute device comprises increasing the adverse impact on the performance of the compute device in response to a determination that the conflict has not be resolved.

Example 33 includes the subject matter of any of Examples 20-32, and wherein determining whether the determined conflict has been resolved comprises periodically determining whether the conflict has been resolved.

Example 34 includes the subject matter of any of Examples 20-33, and wherein adversely impacting the performance characteristic of the compute device comprises generating alerts to a processor of the compute device.

Example 35 includes the subject matter of any of Examples 20-34, and wherein adversely impacting the performance characteristic of the compute device comprises slowing a process executed by the compute device.

Example 36 includes the subject matter of any of Examples 20-35, and wherein adversely impacting the performance characteristic of the compute device comprises deprioritizing a process executed by the compute device.

Example 37 includes the subject matter of any of Examples 20-36, and wherein adversely impacting the performance characteristic of the compute device comprises increasing an amount of data supplied to a processor of the compute device.

Example 38 includes the subject matter of any of Examples 20-37, and wherein adversely impacting the performance characteristic of the compute device comprises adjusting a priority associated with the sensor data from which the implications involved in the determined conflict were determined.

Example 30 includes one or more computer-readable storage media comprising a plurality of instructions that, when executed, cause a compute device to perform the method of any of Examples 20-38.

Example 40 includes a compute system for managing sensor conflicts of the compute system. The compute system includes means for obtaining sensor data from a plurality of sensors of the compute system, wherein the sensor data is produced by the plurality of sensors in response to a corresponding stimulus sensed by each sensor; means for determining an implication of the stimulus sensed by each sensor; means for determining a conflict between two or more implications of the stimuli, and means for applying discomfort to the compute device in response to the determined conflict between the two or more implications of stimuli exist, wherein the means for applying discomfort comprises means for adversely impacting a performance characteristic of the compute device based on the determined conflict.

Example 41 includes the subject matter of Example 40, and wherein the means for determining the implication of the stimulus sensed by each sensor comprises means for determining the implication for the stimulus sensed by each sensor based on a set of implication rules that correlate predefined implications and types of sensor data.

Example 42 includes the subject matter of Example 40 or 41, and wherein the means for determining the implication of the stimulus sensed by each sensor comprises means for determining a characteristic of the compute device based on the sensor data.

Example 43 includes the subject matter of any of Examples 40-42, and wherein the means for determining the implication of the stimulus sensed by each sensor comprises means for determining a characteristic of an environment of the compute device based on the sensor data.

Example 44 includes the subject matter of any of Examples 40-43, and wherein the means for determining a conflict between two or more implications of the stimuli comprises means for determining a conflict between two or more implications of the stimuli based on a set of correlation rules, wherein each correlation rule defines an expected relationship between the two or more implications of the stimuli.

Example 45 includes the subject matter of any of Examples 40-44, and wherein the means for determining the conflict between the two or more implications of stimuli comprises means for determining a magnitude of the conflict between the two or more implications of stimuli.

Example 46 includes the subject matter of any of Examples 40-45, and wherein the means for applying discomfort to the compute device comprises means for applying discomfort to the compute device based on the magnitude of the conflict between the two or more implications of stimuli.

Example 47 includes the subject matter of any of Examples 40-46, and wherein the means for applying discomfort to the compute device comprises means for adversely impacting the performance characteristic of the compute device as a function of the magnitude of the conflict between the two or more implications of stimuli.

Example 48 includes the subject matter of any of Examples 40-47, and wherein the means for determining the conflict between the two or more implications of stimuli comprises means for determining a level of importance of the conflict between the two or more implications of stimuli.

Example 49 includes the subject matter of any of Examples 40-48, and wherein the means for applying discomfort to the compute device comprises means for applying discomfort to the compute device based on the level of importance of the conflict between the two or more implications of stimuli.

Example 50 includes the subject matter of any of Examples 40-49, and wherein the means for applying discomfort to the compute device comprises means for adversely impacting the performance characteristic of the compute device as a function of the level of importance of the conflict between the two or more implications of stimuli.

Example 51 includes the subject matter of any of Examples 40-50, and further comprising means for determining whether the determined conflict has been resolved; and means for increasing the discomfort to the compute device in response to a determination that the conflict has not been resolved.

Example 52 includes the subject matter of any of Examples 40-51, and wherein the means for increasing the discomfort to the compute device comprises means for increasing the adverse impact on the performance of the compute device in response to a determination that the conflict has not be resolved.

Example 53 includes the subject matter of any of Examples 40-52, and wherein the means for determining whether the determined conflict has been resolved comprises means for periodically determining whether the conflict has been resolved.

Example 54 includes the subject matter of any of Examples 40-53, and wherein the means for adversely impacting the performance characteristic of the compute device comprises means for generating alerts to a processor of the compute device.

Example 55 includes the subject matter of any of Examples 40-54, and wherein the means for adversely impacting the performance characteristic of the compute device comprises means for slowing a process executed by the compute device.

Example 56 includes the subject matter of any of Examples 40-55, and wherein the means for adversely impacting the performance characteristic of the compute device comprises means for deprioritizing a process executed by the compute device.

Example 57 includes the subject matter of any of Examples 40-56, and wherein the means for adversely impacting the performance characteristic of the compute device comprises means for increasing an amount of data supplied to a processor of the compute device.

Example 58 includes the subject matter of any of Examples 40-57, and wherein the means for adversely impacting the performance characteristic of the compute device comprises means for adjusting a priority associated with the sensor data from which the implications involved in the determined conflict were determined.

The invention claimed is:

1. A compute system for managing sensor conflicts of the compute system, the compute system comprising:
   a first sensor to produce first sensor data in response to a first stimulus;
   a second sensor to produce second sensor data in response to a second stimulus; and
   a compute device to verify whether the first sensor and the second sensor are operating correctly and to, in response to a successful verification that the first sensor and the second sensor are operating correctly, obtain the first sensor data and the second sensor data from the first sensor and the second sensor, respectively, wherein the compute device comprises: a conflict management circuitry to (i) determine a first implication of the first stimulus based on the first sensor data, (ii) determine a second implication of the second stimulus based on the second sensor data, (iii) determine a conflict between the first implication and the second implication, (iv) apply discomfort to the compute device in response to the determined conflict between the first implication and the second implication, (v) determine whether the determined conflict has been resolved, and (vi) increase the discomfort to the compute device in response to a determination that the conflict has not been resolved,
   wherein to apply discomfort to the compute device comprises to adversely impact a performance characteristic of the compute device based on the determined conflict.

2. The compute system of claim 1, wherein to:
   determine the first implication of the first stimulus based on the first sensor data comprises to determine a first characteristic of the compute device based on the first sensor data, and
   determine the second implication of the second stimulus based on the second sensor data comprises to determine a second characteristic of the compute device based on the second sensor data.

3. The compute system of claim 1, wherein to:
   determine the first implication of the first stimulus based on the first sensor data comprises to determine a first characteristic of an environment of the compute device based on the first sensor data, and
   determine the second implication of the second stimulus based on the second sensor data comprises to determine a second characteristic of an environment of the compute device based on the second sensor data.

4. The compute system of claim 1, further comprising a data storage to store a set of correlation rules that define an expected relationship between the first implication and the second implication, and
  wherein to determine the conflict between the first implication and the second implication comprises to determine the conflict between the first implication and the second implication based on the set of correlation rules.

5. The compute system of claim 1, wherein to determine the conflict between the first implication and the second implication comprises to determine a magnitude of the conflict between the first implication and the second implication.

6. The compute system of claim 5, wherein to apply discomfort to the compute device comprises to adversely impact the performance characteristic of the compute device as a function of the magnitude of the conflict between the first implication and the second implication.

7. The compute system of claim 1, wherein to determine the conflict between the first implication and the second implication comprises to determine a level of importance of the conflict between the first implication and the second implication.

8. The compute system of claim 7, wherein to apply discomfort to the compute device comprises to adversely impact the performance characteristic of the compute device as a function of the level of importance of the conflict between the first implication and the second implication.

9. A method for managing sensor conflicts in a compute system, the method comprising:
  verifying whether each of a plurality of sensors is operating correctly;
  obtaining, by circuitry in a compute device of the compute system, sensor data from the plurality of sensors of the compute system in response to a successful verification that each of the plurality of sensors is operating correctly, wherein the sensor data is produced by the plurality of sensors in response to a corresponding stimulus sensed by each sensor;
  determining, by the compute device, an implication of the stimulus sensed by each sensor;
  determining, by the compute device, a conflict between two or more implications of the stimuli;
  applying, by the compute device, discomfort to the compute device in response to the determined conflict between the two or more implications of stimuli exist, wherein applying discomfort comprises adversely impacting a performance characteristic of the compute device based on the determined conflict;
  determining whether the determined conflict has been resolved; and
  increasing the discomfort to the compute device in response to a determination that the conflict has not been resolved.

10. The method of claim 9, wherein determining the implication of the stimulus sensed by each sensor comprises determining the implication for the stimulus sensed by each sensor based on a set of implication rules that correlate predefined implications and types of sensor data.

11. The method of claim 9, wherein determining a conflict between two or more implications of the stimuli comprises determining a conflict between two or more implications of the stimuli based on a set of correlation rules, wherein each correlation rule defines an expected relationship between the two or more implications of the stimuli.

12. The method of claim 9, wherein determining the conflict between the two or more implications of stimuli comprises determining a magnitude of the conflict between the two or more implications of stimuli.

13. The method of claim 12, wherein applying discomfort to the compute device comprises adversely impacting the performance characteristic of the compute device as a function of the magnitude of the conflict between the two or more implications of stimuli.

14. The method of claim 9, wherein determining the conflict between the two or more implications of stimuli comprises determining a level of importance of the conflict between the two or more implications of stimuli.

15. The method of claim 14, wherein applying discomfort to the compute device comprises adversely impacting the performance characteristic of the compute device as a function of the level of importance of the conflict between the two or more implications of stimuli.

16. One or more non-transitory computer-readable storage media comprising a plurality of instructions that, when executed, cause a compute device to:
  verify whether each of a plurality of sensors is operating correctly;
  obtain, by a circuitry of the compute device, sensor data from the plurality of sensors of the compute system in response to a successful verification that each of the plurality of sensors is operating correctly, wherein the sensor data is produced by the plurality of sensors in response to a corresponding stimulus sensed by each sensor;
  determine an implication of the stimulus sensed by each sensor;
  determine a conflict between two or more implications of the stimuli;
  apply discomfort to the compute device in response to the determined conflict between the two or more implications of stimuli exist, wherein applying discomfort comprises adversely impacting a performance characteristic of the compute device based on the determined conflict;
  determine whether the determined conflict has been resolved; and
  increase the discomfort to the compute device in response to a determination that the conflict has not been resolved.

17. The one or more non-transitory computer-readable storage media of claim 16, wherein to determine the implication of the stimulus sensed by each sensor comprises to determine the implication for the stimulus sensed by each sensor based on a set of implication rules that correlate predefined implications and types of sensor data.

18. The one or more non-transitory computer-readable storage media of claim 16, wherein to determine a conflict between two or more implications of the stimuli comprises to determine a conflict between two or more implications of the stimuli based on a set of correlation rules, wherein each correlation rule defines an expected relationship between the two or more implications of the stimuli.

19. The one or more non-transitory computer-readable storage media of claim 16, wherein to determine the conflict between the two or more implications of stimuli comprises to determine a magnitude of the conflict between the two or more implications of stimuli.

20. The one or more non-transitory computer-readable storage media of claim 19, wherein to apply discomfort to the compute device comprises to adversely impact the performance characteristic of the compute device as a function of the magnitude of the conflict between the two or more implications of stimuli.

21. The one or more non-transitory computer-readable storage media of claim 16, wherein to determine the conflict between the two or more implications of stimuli comprises to determine a level of importance of the conflict between the two or more implications of stimuli.

22. The one or more non-transitory computer-readable storage media of claim 21, wherein to apply discomfort to the compute device comprises to adversely impact the performance characteristic of the compute device as a function of the level of importance of the conflict between the two or more implications of stimuli.

* * * * *